United States Patent
Sharma et al.

(10) Patent No.: US 11,968,537 B2
(45) Date of Patent: Apr. 23, 2024

(54) METHODS AND APPARATUSES FOR MANAGING COMPROMISED COMMUNICATION DEVICES IN A COMMUNICATION NETWORK

(71) Applicant: Telefonaktiebolaget LM Ericsson (publ), Stockholm (SE)

(72) Inventors: Nipun Sharma, New Delhi (IN); Rakesh Bajpai, New Delhi (IN); Rajiv Bhardwaj, Jalandhar (IN); Robin Kaushik, Mississauga (CA); Hans Eriksson, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 244 days.

(21) Appl. No.: 17/772,540

(22) PCT Filed: Nov. 4, 2019

(86) PCT No.: PCT/SE2019/051106
§ 371 (c)(1),
(2) Date: Apr. 28, 2022

(87) PCT Pub. No.: WO2021/091435
PCT Pub. Date: May 14, 2021

(65) Prior Publication Data
US 2022/0369112 A1 Nov. 17, 2022

(51) Int. Cl.
*H04W 12/80* (2021.01)
*H04L 9/40* (2022.01)
*H04W 12/122* (2021.01)

(52) U.S. Cl.
CPC ....... *H04W 12/122* (2021.01); *H04L 63/1466* (2013.01); *H04W 12/80* (2021.01)

(58) Field of Classification Search
CPC .............................. H04W 12/12; H04W 12/80
See application file for complete search history.

(56) References Cited

U.S. PATENT DOCUMENTS 11,317,321 B1 * 4/2022 Paczkowski .......... H04W 28/06
2015/0373546 A1 12/2015 Haugen et al.
(Continued)

FOREIGN PATENT DOCUMENTS

CN 108401275 A 8/2018
CN 109951440 A 6/2019
(Continued)

OTHER PUBLICATIONS

"3rd Generation Partnership Project; Technical Specification Group Core Network and Terminals; 5G System; Network Exposure Function Northbound APIs; Stage 3 (Release 16)", 3GPP TS 29.522 V16.1.0, Sep. 2019, 82 pages.
(Continued)

*Primary Examiner* — Michael T Vu
(74) *Attorney, Agent, or Firm* — Murphy, Bilak & Homiller, PLLC

(57) ABSTRACT

A communication network (10) provides communicative coupling between potentially large populations of Internet-of-Things (IoT) devices (12) and/or other types of communication devices (12) and one or more Application Servers (ASs) (14) that are affiliated with respective ones of the communication devices (12). One or more network functions (30, 58) in the communication network (10) are operative to determine that any given one of the communication devices (12) is compromised, or that multiple such devices (12) are compromised, and provide for management of such devices (12) within the network (10) as "compromised" devices (12). Aspects of compromised-device management include forcing re-registration of such devices (12), for quarantining them in one or more quarantine network (Continued)

slices (54), and recovering quarantined devices (12) after remediation of the compromise. Recovery operations include forcing re-registration of devices (12) being recovered, for migration back to their normal or regular network slice(s) (50).

17 Claims, 9 Drawing Sheets

(56) References Cited

U.S. PATENT DOCUMENTS

| | | | |
|---|---|---|---|
| 2017/0353490 | A1 | 12/2017 | Krauss et al. |
| 2018/0013761 | A1 | 1/2018 | Bachar et al. |
| 2019/0026094 | A1 | 1/2019 | Stammers et al. |
| 2019/0141562 | A1 | 5/2019 | Tyagi et al. |
| 2019/0159015 | A1* | 5/2019 | Qiao ............... H04L 67/143 |
| 2019/0289513 | A1 | 9/2019 | Jeon et al. |
| 2020/0267786 | A1* | 8/2020 | Qiao ............... H04W 4/24 |

FOREIGN PATENT DOCUMENTS

| | | |
|---|---|---|
| CN | 110278096 A | 9/2019 |
| EP | 3544337 A1 | 9/2019 |
| EP | 4055896 A1 | 9/2022 |
| KR | 20190057109 A | 5/2019 |
| WO | 2019201458 A1 | 10/2019 |
| WO | 2021091435 A1 | 5/2021 |

OTHER PUBLICATIONS

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 16)", 3GPP TS 29.272 V16.0.0, Sep. 2019, 180 pages.

"3rd Generation Partnership Project; Technical Specification Group Core Network and Terminals; T8 reference point for Northbound APIs; (Release 16)", 3GPP TS 29.122 V16.3.0, Sep. 2019, 321.

"3rd Generation Partnership Project; Technical Specification Group Radio Access Network; NR; NR and NG-RAN Overall Description; Stage 2 (Release 15)", 3GPP TS 38.300 V15.7.0, Sep. 2019, 99 pages.

"3rd Generation Partnership Project; Technical Specification Group Services and System Aspects; 3G security; Lawful interception architecture and functions (Release 15)", 3GPP TS 33.107 V15.6.0, Jun. 2019, 386 pages.

"3rd Generation Partnership Project; Technical Specification Group Services and System Aspects; Policy and Charging Control Framework for the 5G System; Stage 2 (Release 16)", 3GPP TS 23.503 V16.1.0, Jun. 2019, 99 pages.

"3rd Generation Partnership Project; Technical Specification Group Services and System Aspects; Service requirements for Machine-Type Communications (MTC); Stage 1 (Release 15)", 3GPP TS 22.368 V15.0.0, Jul. 2019, 26 pages.

"3rd Generation Partnership Project; Technical Specification Group Services and System Aspects; Study of Enablers for Network Automation for 5G (Release 16)", 3GPP TR 23.791 V16.2.0, Jun. 2019, 124.

"3rd Generation Partnership Project; Technical Specification Group Services and System Aspects; Study on Cellular Internet of Things (CIoT) support and evolution for the 5G System (5GS) (Release 16)", 3GPP TR 23.724 V16.1.0, Jun. 2019, 274.

"3rd Generation Partnership Project; Technical Specification Group Services and System Aspects; System Architecture for the 5G System (5GS); Stage 2 (Release 16)", 3GPP TS 23.501 V16.2.0, Sep. 2019, 391.

"3rd Generation Partnership Project; Technical Specification Group Services and System Aspects; System Architecture for the 5G System; Stage 2 (Release 16)", 3GPP TS 23.501 V16.0.0, Mar. 2019, 318 pages.

Beijar, Nicklas, "Serving up secure IoT with network slicing security", Blog from Ericsson's company site dated Sep. 4, 2019., Sep. 4, 2019, 4 pages.

* cited by examiner

METHODS AND APPARATUSES FOR MANAGING COMPROMISED COMMUNICATION DEVICES IN A COMMUNICATION NETWORK

TECHNICAL FIELD

The present invention relates to communication networks and specifically relates to managing compromised communication devices in a communication network.

BACKGROUND

A "communication device" or "device" is any communication apparatus that is operative to access the communication network, with a non-limiting example being an Internet-of-Things (IoT) device having a radio communication interface operative to access a Radio Access Network (RAN) portion of the communication network, for communicatively coupling to an Application Server (AS) accessible via the communication network. Such devices may be referred to a "User Equipment" or UEs, to identify them as "users" of the communication network rather than equipment belonging to the network infrastructure. "User" in this context does not necessarily imply or require human use of the UE and, in many cases, the UEs in question are Machine Type Communication (MTC) devices or IoT devices.

Areas of particular interest include NarrowBand IoT (NB-IoT) devices and Category M1 MTC devices. NB-IoT supports ultra-low complexity devices with very narrow bandwidths, i.e., 200 kHz. The data rate peaks at around 250 kbs per second for NB-IoT, as a consequence of the narrow bandwidths, however, a key advantage is that an NB-IoT carrier can be deployed in spectrum that would otherwise go unused, such as within the guard-band of an LTE carrier. Cat-M1 devices operate with higher bandwidths, e.g., with a 1.4 MHz bandwidth, and typically have higher complexity than NB-IoT devices. See the Third Generation Partnership Project (3GPP) Technical Specification (TS) 22.368 V15.0.0 (2019 Jul. 4), for example information regarding IoT devices.

With a view towards the new capabilities and use-cases provided by networks based on the Fifth Generation (5G) New Radio (NR) specifications, network operators expect massive deployments of communication devices for a multiplicity of applications, including smart metering of utilities, security and monitoring, process control, vehicle-to-vehicle (V2V) communications, and vehicle-to-everything (V2X) communications, such as used in smart traffic management and autonomous driving.

As an example, a utility company installs many thousands of smart meters for metering electricity, water, or another distributed consumable, with each meter including an embedded communication device that uses a communication network for communicating with an Application Server (AS) that is controlled by the utility company. The communication network is, for example, a wireless communication network, such as a cellular communication network based on the 5G/NR specifications promulgated by the 3GPP, such as TS 38.300 V15.7.0 (2019 Sep. 26). Each of the embedded communication devices is associated with a subscription or other credentials that authorize the communication device to access the wireless communication network. And, of course, there may be multiple other third-party companies that also use the communication network to connect with other deployed sets of communication devices. Still further, the communication network may support many individual subscribers, such as mobile broadband customers using smartphones or other personal mobile devices for a range of data services.

"Network slicing" represents one rapidly developing technique for supporting different types of communication devices or different types of communication services using segregated network resources. A "network slice" is a separate "logical network" instantiated on a shared physical network infrastructure, with the logical network realized using Network Function Virtualization (NFV) and Software Defined Network (SDN) techniques. By using network slices, a communication network provides multiple, distinct logical networks, e.g., with each logical network supporting different groups or types of users. For example, different network slices or groups of slices may be defined for different types of communication services, with each slice then being configured for the applicable service parameters, such as Quality-of-Service (QoS) requirements, performance metrics associated with Service Level Agreements (SLAs), etc.

However, because of the potentially large numbers of communication devices supported by such a communication network, the potential for device misbehavior becomes an acute concern. Consider an example case where malicious or faulty software increases the rate of transmissions or the size of transmissions for a large population of deployed communication devices. As a specific scenario, a certain type of IoT device may be deployed in large numbers, for infrequent reporting (e.g., daily) of small amounts of collected data. To the extent that faulty or maliciously altered software in the devices causes them to communicate more often or to send more than the normal amount of data, the network is at risk for congestion or even an outage.

SUMMARY

A communication network provides communicative coupling between potentially large populations of Internet-of-Things (IoT) devices and/or other types of communication devices and one or more Application Servers (ASs) that are affiliated with respective ones of the communication devices. One or more network functions in the communication network are operative to determine that any given one of the communication devices is compromised, or that multiple such devices are compromised, and provide for management of such devices within the network as "compromised" devices. Aspects of compromised-device management include forcing re-registration of such devices, for quarantining them in one or more quarantine network slices, and recovering quarantined devices after remediation of the compromise. Recovery operations include forcing re-registration of devices being recovered, for migration back to their normal or regular network slice(s).

One embodiment entails a method of managing compromised devices in a communication network. One or more network nodes implementing a Network Exposure Function (NEF) in the communication network performs the method, which includes communicatively coupling with an Application Server (AS) that supports one or more application services used by a communication device that communicatively couples with the AS via a first network slice provided by the communication network. Further, the method includes determining that the communication device is compromised. The determination is based on detecting a device anomaly regarding the communication device, the device anomaly being an anomalous state or behavior of the communication device, or the determination is based on receiving signaling incoming from the AS, indicating that the communication device (12) is compromised.

In either case, the method includes, responsive to determining that the communication device is compromised, initiating quarantine operations to move the communication device from the first network slice to a second network slice, for management of the communication device as a compromised device. The second network slice is referred to as a quarantine network slice and the quarantine operations include sending a request to a Network Slice Selection Function (NSSF), to initiate re-registration of the communication device with the communication network, for re-connection of the communication device to the communication network via the quarantine network slice.

In another example embodiment, a network node is configured for operation in a communication network, where the node includes interface circuitry and processing circuitry. The interface circuitry is configured to communicatively couple the network node with an AS that supports one or more application services used by a communication device that communicatively couples with the AS via a first network slice provided by the communication network.

The processing circuitry is operatively associated with the interface circuitry and configured to implement a NEF in the communication network, where the NEF is configured to determine that the communication device is compromised. For example, the determination is based on the NEF detecting a device anomaly regarding the communication device, the device anomaly being an anomalous state or behavior of the communication device, or the determination is based on the NEF receiving signaling incoming from the AS, indicating that the communication device is compromised. Either way, the NEF is configured to initiate quarantine operations to move the communication device from the first network slice to a second network slice, for management of the communication device as a compromised device. The second network slice is referred to as a quarantine network slice and the NEF initiates the quarantine operations responsive to determining that the communication device is compromised. Example quarantine operations include sending a request to an NSSF, to initiate re-registration of the communication device with the communication network, for re-connection of the communication device to the communication network via the quarantine network slice.

In another example embodiment, a network node is configured for operation in a communication network and it includes a set of processing modules operative as a NEF in the communication network. The set includes a communicating module configured to communicatively couple the NEF with an AS that supports one or more application services used by a communication device that communicatively couples with the AS via a first network slice provided by the communication network. Further, the set includes a determining module configured to determine that the communication device is compromised, based on detecting a device anomaly regarding the communication device, the device anomaly being an anomalous state or behavior of the communication device, or based on receiving signaling incoming from the AS, indicating that the communication device is compromised. Still further, the set includes a quarantining module that is configured to initiate quarantine operations to move the communication device from the first network slice to a second network slice, for management of the communication device as a compromised device. The second network slice is referred to as a quarantine network slice and quarantining module initiates the quarantine operations responsive to the determination that the communication device is compromised. Such operations include sending a request to an NSSF, to initiate re-registration of the communication device with the communication network, for re-connection of the communication device to the communication network via the quarantine network slice.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
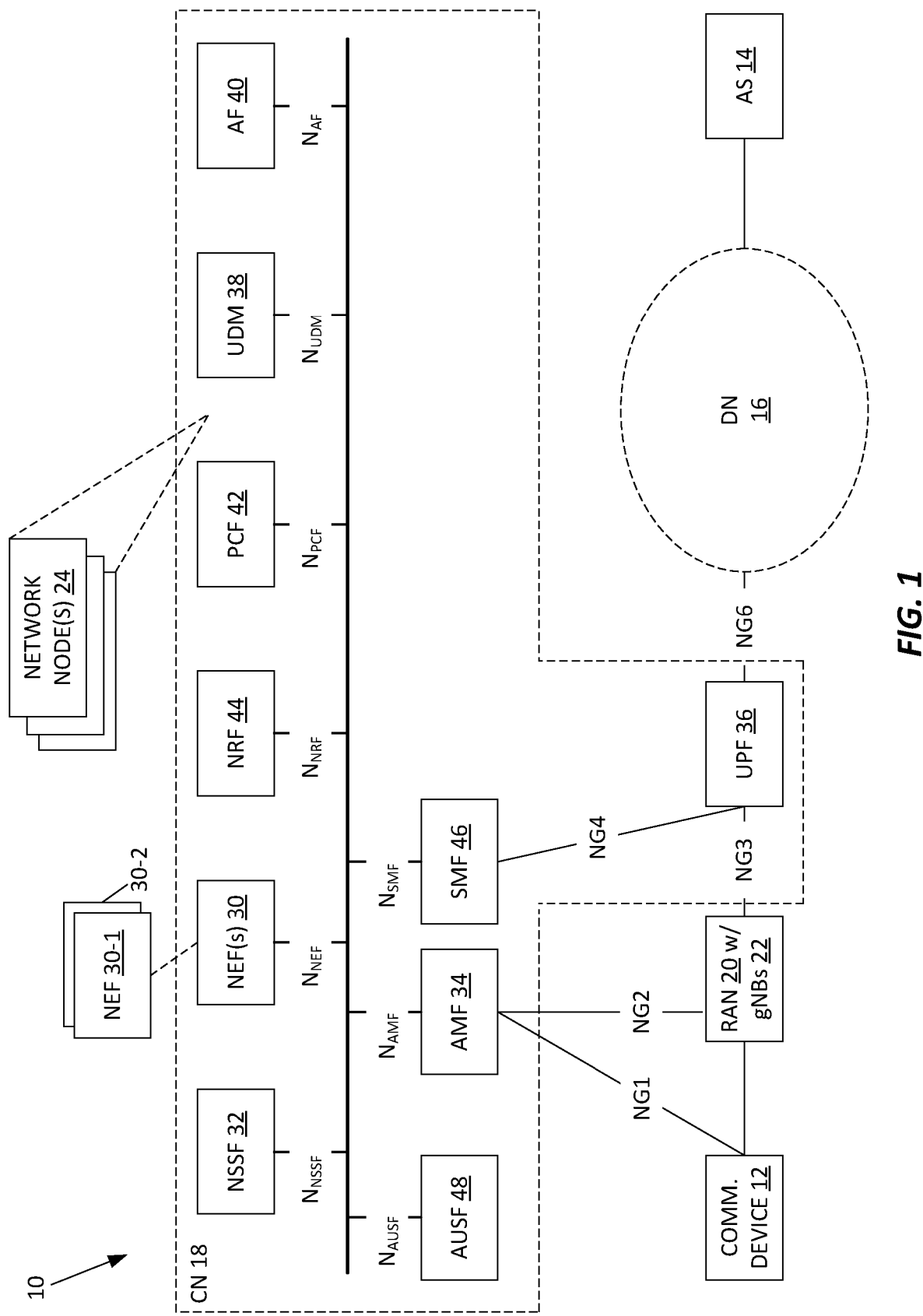
FIG. 1 is a block diagram of one embodiment of a communication network.

FIG. 1 illustrates a communication network 10 ("network 10"), using example nomenclature associated with Fifth Generation (5G) New Radio (NR) wireless communication networks conforming with the applicable Technical Specifications (TSs) promulgated by the Third Generation Partnership Project (3GPP). See, for example, 3GPP TS 23.501 V16.2.0 (2019 Sep. 24). However, the methods and apparatuses disclosed herein for managing "compromised" communication devices are not limited to implementations of the network 10 based on 5G/NR standards, and it will be understood that other network standards or types may use different nomenclature to identify the same or similar underlying functionalities.

The network 10 supports a potentially large number of communication devices 12, although for simplicity the diagram depicts only one communication device 12. Communicative coupling by the network 10 of the communication device 12 to an external Data Network (DN) 16 provides the communication device 12 with access to an Application Server (AS) 14. In an example case, the AS 14 belongs to a third party—not owned by the owner/operator of the network 10—and the communication device 12 runs one or more software applications that involve the exchange of communications between the communication device 12 and the AS 14. For example, the communication device 12 is an embedded communication device, such as an MTC or IoT device, that performs monitoring or control and exchanges related data and control signaling with the AS 14. There may be many such communication devices 12 being supported by the network 10, and that large plurality of communication devices 12 may involve different types of devices and different types of communication services.

Correspondingly, the network 10 may couple to additional ASs 14 through the same or additional DNs 16. For example, there may be multiple third parties, each providing one or more ASs 14, and each deploying potentially large groups or sets of communication devices 12 that are credentialed or otherwise authorized to access their respective ASs 14 through the network 10. As such, the network 10 in one or more operational scenarios supports different groups or kinds of communication devices 12, such as multiple groups or kinds of IoT devices.

Among its constitute parts or portions, the network 10 includes a Core Network (CN) 18 and a Radio Access Network (RAN) 20, with the RAN 20 providing radio links for connecting to respective communication devices 12. The RAN 20 includes a number of access points, such as base stations or other types of radio transceiver nodes. In the 5G/NR context, the term "gNB" denotes radio base stations and the example RAN 20 includes one or more gNBs 22.

The CN 18 includes one or more Network Exposure Functions (NEFs) 30, one or more Network Slice Selection Functions (NSSFs) 32, one or more Access and Mobility Management Functions (AMFs) 34, one or more User Plane Functions (UPFs) 36, one or more Unified Data Managements (UDMs) 38, one or more Application Functions (AFs) 40, one or more Policy and Control Functions (PCFs) 42, one or more Network Repository Functions (NRFs) 44, one or more Session Management Functions (SMFs) 46, and one or more Authentication Server Functions (AUSF) 48. One or more network nodes 24 implement the foregoing array of functions, e.g., one or more appropriately configured computer servers or other computer-based processing nodes with interface circuitry for inter-function communications.

Operational details of at least some of the foregoing functions are not directly germane to the methods and apparatuses contemplated herein for managing compromised communication devices, but generalized operations are detailed in 3GPP TS 23.501. Herein, a "compromised" communication device is a communication device 12 that is identified being associated with a device anomaly.

A "device anomaly" is an anomalous state or behavior of the communication device 12 that is "anomalous" in the sense that it departs from an expected state or behavior. The term "compromised" thus reflects a "deemed" or "logical" state or quality, where it is likely but not necessarily definitively known by the network 10 that the communication device 12 is operating incorrectly or being misused. While the term "compromised" encompasses device behavior arising from viruses, malware, or other malicious alterations of the device software, it more broadly refers to any communication device 12 that is detected or identified as having an anomalous configuration or exhibiting anomalous behavior. For example, a given communication device 12 may have a latent hardware or software error that causes it to malfunction sometime after its initial deployment.

Examples of behavioral anomalies include deviations from historical or characteristic patterns of user-plane or control-plane activity. Such a communication device 12 also may be referred to as exhibiting "aberrant" behavior. In one or more example embodiments, or in at least one operational scenario, a communication device 12 has an "expected" state or behavior, based on the network 10 storing historic information collected for the communication device 12 that defines the expected state or behavior. Additionally, or alternatively, the network 10 stores configuration information that defines the expected state or behavior of a given communication device 12, a given group of communication devices 12, or a given type, class, or category of communication devices 12.

Among the functions illustrated for the CN 18 of FIG. 1, several are of particular interest, including the NEF(s) 30. In a Fourth Generation (4G) network context, at least some of the functionality of a NEF 30 is implemented via a Service Capability Exposure Function (SCEF), and it shall be understood that any reference to "NEF" herein encompasses SCEFs, unless otherwise noted. Among other things, SCEFs provided advantages for the use of IoT/MTC devices in the 4G context, by allowing small amounts of data to be transported in control-plane signaling, which allowed small bursts of traffic from IoT/MTC devices to be conveyed via control-plane connections, rather than establishing user-plane connections for each such burst.

In the 5G/NR context, a NEF 30 provides a mechanism for exposing network capabilities and network events, such as events involving the operation of particular communication devices 12 within the network 10, to external systems and services, while maintaining network security. The NEF 30 also provides for secure provisioning of information from external applications, along with translating information between the network 10 and external systems, such as the AS 14 depicted in FIG. 1. 3GPP documents of interest regarding the NEF 30 and the IoT context include TS23.724, TR 23.791, TS 29.122, and TS 29.522.

Figure 2:
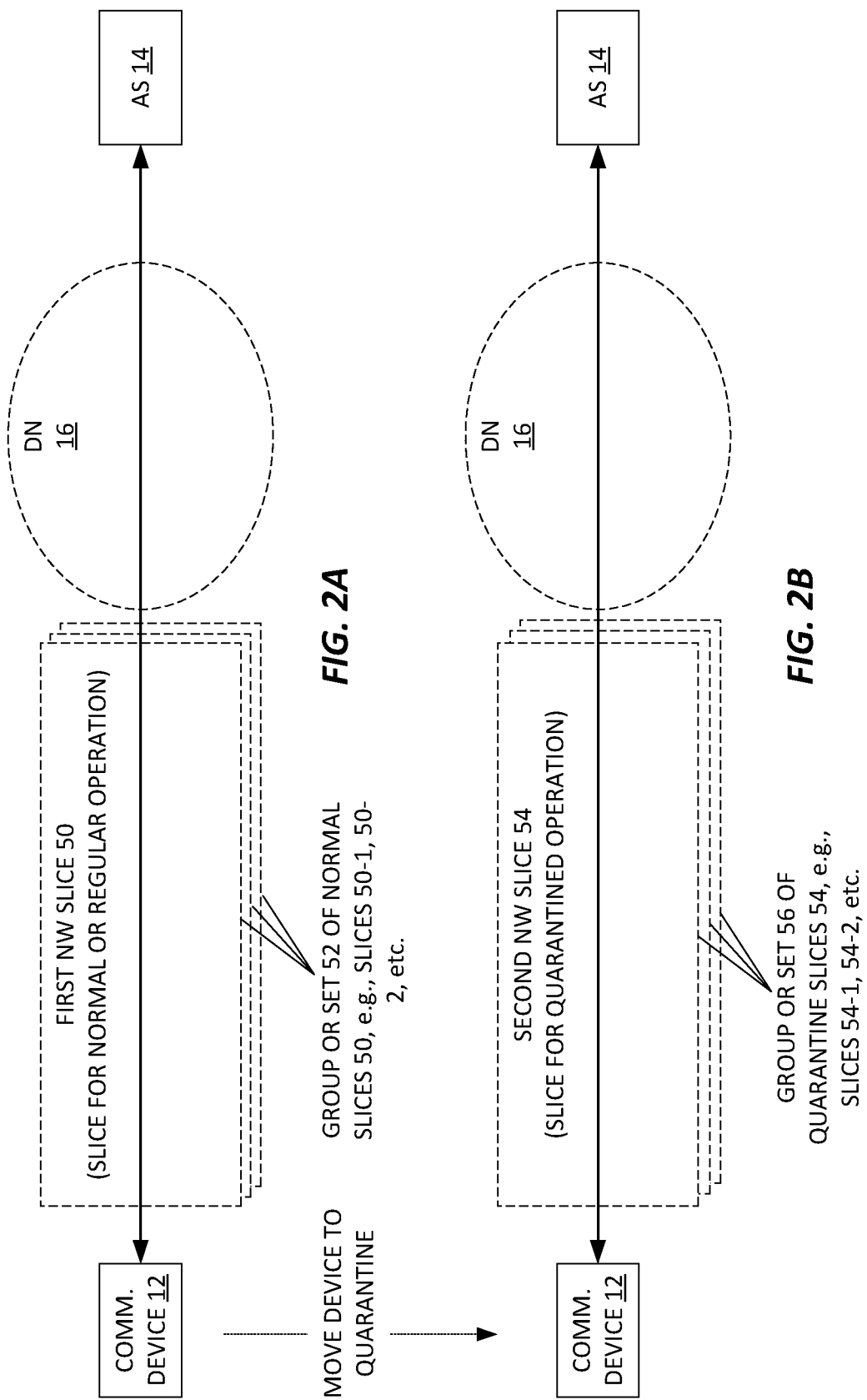
FIGS. 2A and 2B are block diagrams of example network slices instantiated in a communication network, for managing compromised communication devices.

Among the various techniques contemplated herein, a NEF 30 performs operations for managing a compromised communication device 12 within the network 10. For example, the NEF 30 performs operations that result in the compromised communication device 12 being moved from a "normal" or "regular" network slice, to a "quarantine" network slice. FIGS. 2A and 2B together illustrate the migration of a communication device 12 from a regular slice to a quarantine slice, with the understanding that the migration occurs responsive to determining that the communication device 12 is compromised.

The network 10 provides, for example, a group or set 52 of normal or regular network slices 50, e.g., regular network slices 50-1, 50-2, etc. Unless suffixing is needed for clarity, the reference number "50" without suffixing refers to any given regular network slice or slices. Similarly, suffixing of other reference numbers herein appears only where helpful for contextual differentiation. Also, the words "normal" and "regular" have their ordinary meaning, and normal or regular network slices 50 can be understood as being provided or established for providing connectivity and communication services to one or more communication devices 12, or for one or more groups, types, or categories of communication devices 12. For example, different regular network slices 50 may correspond to different Service Level Agreements (SLAs) or other business agreements, or different Quality-of-Service (QoS) requirements, or different kinds of communication services, or different ASs 14, or different Data Network Names (DNNs), or to different combinations of any such parameters.

The applicable caveat for the regular network slices 50 is that they are, as a general proposition, used for uncompromised communication devices 12—i.e., communication devices 12 that have not been determined by the network 10 to be compromised. Correspondingly, the network 10 may provide or otherwise define one or more additional network slices 54, referred to as one or more "quarantine" network slices 54. For example, the network 10 defines a group or set 56 of quarantine slices 54, e.g., quarantine network slices 54-1, 54-2, etc.

There may be a correspondence between regular network slices 50 and quarantine network slices 54. For example, there may be a corresponding quarantine slice 54 for every regular network slice 50 that is specific to a particular communication device 12, or specific to a particular group, type, or category of communication devices 12. Such arrangements constitute a one-to-one mapping between regular slices 50 and quarantine slices 54. Other arrangements are contemplated, such as a many-to-one mapping, where multiple regular network slices 50 map to one quarantine network slice 54. And, of course, network slice instantiation may be on-demand, as regards the regular network slices 50, or the quarantine network slices 54, or both. For example, the network 10 may instantiate new regular network slices 50 to control the number of communication devices 12 served in any given regular network slice 50 and, similarly, may control the number of quarantine network slices 54 that are instantiated, in dependence on how many communication devices 12 are operating in quarantine.

Figure 3:
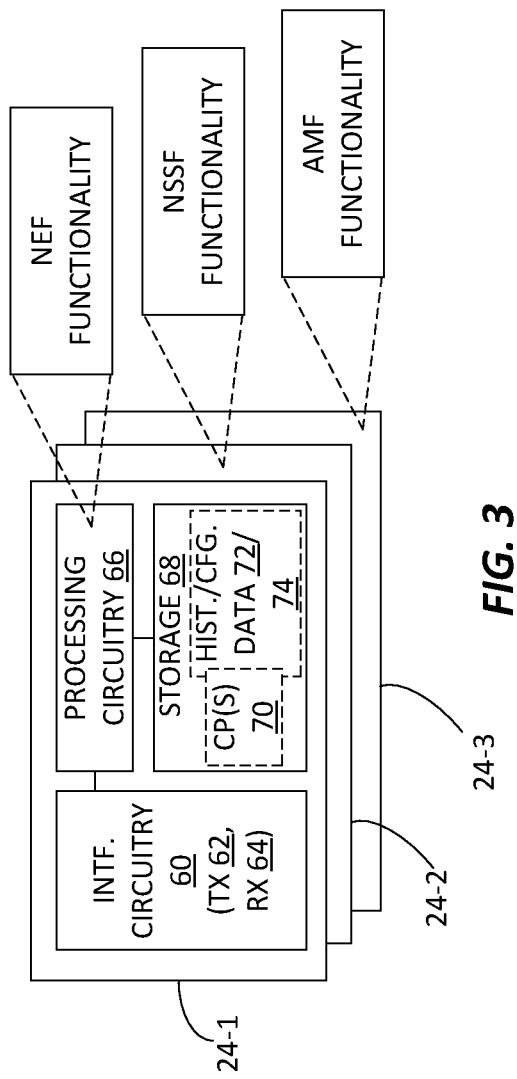
FIG. 3 is a block diagram of one embodiment of a network node or nodes, as used to implement one or more of the functional elements of a core-network portion of a communication network.

To understand more about how the network 10 manages compromised communication devices 12 in the sliced-network context, FIG. 3 depicts one or more network nodes 24, e.g., 24-1, 24-2, 24-3, and so on, that are used to implement the CN 18 of the network 10. There may be any number of network nodes 24 in the CN 18, along with network interconnections therebetween, and, while the reference number "24" is used as a common identifier for any given network node in the CN 18, different nodes in the CN 18 may have different implementation details, including differences in processing architecture and power, differences in input/output interfaces, etc. Further, unless otherwise noted, any reference to a network node 24 in the singular shall be understood as contemplating one or more network nodes 24, such as where different functions reside in different network nodes 24 or where a given function involves a distributed implementation involving cooperative processing across two or more network nodes 24. Still further, any or all of the underlying processing circuitry and corresponding function instantiations by a network node 24 may be cloud-based or otherwise virtualized in one or more host servers, e.g., in a data center. Of course, virtualized network nodes or functions still entail physical processing circuitry and interface circuitry in the underlying physical computer system.

In the illustrated example, a network node 24 includes interface circuitry 60, including transmitter circuitry 62 and receiver circuitry 64. In an example embodiment, the interface circuitry 60 comprises a computer-data network interface, such as an Ethernet interface. Of course, the Ethernet example is non-limiting and the interface circuitry 60 more generally comprises physical-layer circuitry for wireline or wireless transmission and reception of signaling, along with supporting protocol processors for embedding and recovering control messages and data from such signaling.

The example network node 24 further includes processing circuitry 66 and associated storage 68. The associated storage 68 comprises, for example, one or more types of computer-readable media, such as volatile, working memory for program execution and data processing, and non-volatile memory or storage devices, for longer-term storage. In at least one embodiment, the storage 68 includes a computer-readable medium that stores historical data (HIST. DATA) 72 and/or configuration data (CFG. DATA) 74 that is used for detecting device anomalies by specific communication devices 12 or by specific groups, kinds, types, or categories of communication devices 12. Non-limiting examples of the storage 68 include any one or more of SRAM, DRAM, FLASH, EEPROM, Solid State Disk (SSD), and electro-magnetic disk storage.

The processing circuitry 66 comprises programmed circuitry or fixed circuitry or a combination of programmed circuitry and fixed circuitry. In at least one embodiment, the processing circuitry 66 is implemented via one or more microprocessors or other digital processing circuitry that is specially adapted to carry out the processing operations described herein, based on the execution of stored computer program instructions. For example, the storage 68 includes one or more memory circuits that store one or more computer programs (CP(s)) 70 that include computer program instructions for execution by the digital processing circuitry, which execution realizes the processing circuitry configurations described herein.

Again, while FIG. 3 illustrates the implementation of different functions (NEF, NSSF, and AMF) in separate network nodes 24-1, 24-2, and 24-3, a given network node 24 may implement multiple functions of the same or different types, e.g., multiple instantiations of a NEF 30, or multiple instantiations of an NSSF 32, etc., or instantiations of a co-located NEF 30 and an NSSF 32. And, of course, whether based on virtualization or other arrangements, a given function, such as a given NEF 30, may be implemented in a distributed fashion across two or more network nodes 24.

With the above implementation flexibility in mind, in an example embodiment, a network node 24 is configured for operation in a communication network, e.g., the network 10 depicted in FIG. 1. The example network node 24 includes interface circuitry 60 that is configured to communicatively couple the network node 24 with an AS 14 that supports one or more application services used by a communication device 12 that communicatively couples with the AS 14 via a first network slice 50 provided by the communication network 10. "Communicative coupling" encompasses both direct and indirect communications. For example, the interface circuitry 60 may communicatively couple the network node 24 to the AS 14 based on their exchanged communications being carried or routed through one or more intermediate nodes, such as gateways, interworking functions, etc.

The example network node 24 further includes processing circuitry 66 that is operatively associated with the interface circuitry 60. Here, being "operatively associated" with the interface circuitry 60 means that the interface circuitry 60 provides messages or other signaling incoming to the processing circuitry 66 from the AS 14 and/or other nodes in the network 10 and/or from other processing elements within the same node. Likewise, the interface circuitry 60 provides the processing circuitry 66 with a mechanism for sending processing results and other signaling to other processing elements in the same node and/or in other nodes. Thus, the interface circuitry 60 may comprise a data network interface, as noted before, but, additionally or alternatively, the interface circuitry 60 may comprise computer bus interface circuitry, e.g., as between server blades, processing clusters, or the like.

The processing circuitry 66 is configured to implement a NEF 30 in the communication network 10, with the NEF 30 being configured to determine that the communication device 12 is compromised. The determination is based on the NEF 30 detecting a device anomaly regarding the communication device 12, the device anomaly being an anomalous state or behavior of the communication device 12, or is based on the NEF 30 receiving signaling incoming from the AS 14, indicating that the communication device 12 is compromised. At least some embodiments of the NEF 30 support both possibilities, i.e., the NEF 30 detects device anomalies as one way of identifying compromised communication devices 12 and supports external detection of compromised communication devices 12 by the involved AS(s) 14.

In any case, the processing circuitry 66 is configured to initiate quarantine operations to move the (compromised) communication device 12 from the first network slice 50 to a second network slice 54, for management of the communication device 12 as a compromised device. The NEF 30 undertakes the initiation responsive to the determination that the communication device 12 is compromised, however that determination is made. And, in this context, the second network slice 54 is referred to as a quarantine network slice 54.

The quarantine operations include the NEF 30 sending a request to an NSSF 32, to initiate re-registration of the communication device 12 with the communication network 10, for re-connection of the communication device 12 to the communication network 10 via the quarantine network slice 54. The particular NSSF 32 targeted by the NEF 30 may depend on, for example, the current network location of the communication device 12, i.e., which equipment in the network is currently involved in serving the compromised communication device 12. For example, the network 10 may be divided into different logical areas, such as tracking or routing areas, and the different logical areas may have correspondingly associated network functions, such as NEFs 30, NSSFs 32, etc.

In one or more embodiments, the processing circuitry 66 is further configured to implement the NSSF 32, which is configured to respond to the request from the NEF 30 by updating slice information for the communication device 12, to indicate the quarantine network slice 54. The NSSF 32 is further configured to send signaling to an AMF 34 of the communication network 10, the signaling indicating to the AMF 34 to initiate the re-registration of the communication device 12. Particularly, the NSSF 32 indicates to the AMF 34 that the quarantine network slice 54 should be selected for the communication device 12.

In one example, saying that the processing circuitry 66 is further configured to implement the NSSF 32 means that the processing circuitry 66 within a single network node 24 implements both the NEF 30 and the NSSF 32. In another example, saying that the processing circuitry 66 is further configured to implement the NSSF 32 means that the term "processing circuitry 66" refers to respective implementations of processing circuitry 66 across two or more separate network nodes 24, with cooperative communication therebetween.

To detect the device anomaly, the NEF 30 in one embodiment is configured to detect, as the anomalous state, an incorrect software identifier or software fingerprint for a software application running in the communication device 12 in support of the one or more application services used by the communication device 12. Such detection is based on comparing a detected software identifier or a detected software fingerprint for the communication device 12 with a stored software identifier or a stored software fingerprint held in the communication network 10 for the communication device 12. The stored identifier or fingerprint is another example of the type of information that may be held as the configuration data 74 depicted in FIG. 3.

In the same or other embodiment(s), the NEF 30 is configured to detect, as the anomalous behavior, anomalous communication activity by the communication device 12 in the network 10. In at least one such embodiment, the detection is based on the NEF 30 detecting a deviation by the communication device 12 from historic or characteristic communication activity, as known from corresponding information stored in the communication network 10 for the communication device 12. The anomalous communication activity comprises, for example, user-plane and/or control-plane activity, where, to detect the deviation by the communication device 12 from the historic or characteristic communication activity, the NEF 30 is configured to evaluate historic communication-activity data collected in the communication network 10 for the communication device 12 and discern one or more user-plane or control-plane events involving the communication device 12 that are anomalous relative to a normative pattern established by the historic communication-data activity.

Anomalous user-plane events are, for example, transmissions of data that differ by type, format, or amount from that seen in the historical information. Differences may be qualified, such as where a data transmission is deemed anomalous because the amount of data differs from the historical norm or average by more than a threshold amount. Further qualification may be applied, such as requiring seeing more than a defined minimum number of anomalous transmissions. In the control-plane context, examples of anomalous activity comprise uncharacteristic connection/disconnection activity, e.g., connecting multiple times a day when the historical pattern indicates once-per-day as "normal" behavior for the communication device 12. Other examples involve unexpected areas of operation, e.g., for a communication device 12 intended to be used at or around a fixed location, connections outside the network service area associated with that fixed location. Or, more generally, mobility within the network 10 by a communication device 12 that is marked as fixed in the relevant stored records.

In other examples or in other embodiments where the anomalous communication activity comprises user-plane and/or control-plane activity, to detect a deviation by a communication device 12 from its historic or characteristic communication activity, the NEF 30 is configured to evaluate historic communication-activity data collected in the network 10 for the communication device 12 and discern one or more user-plane or control-plane events involving the communication device 12 that are anomalous relative to a normative pattern established by the historic communication-data activity.

"Detecting" anomalous behavior by individual communication devices 12 may involve the NEF 30 collecting and storing the baseline information—the historic or configured data—used for detecting device anomalies, and performing the data processing and comparisons needed for such detections. Alternatively, the NEF 30 may access information collected and stored by other nodes in the CN 18. Still further, in at least some embodiments, the NEF 30 determines that any given communication device 12 is compromised, in dependence on receiving signaling from another node that indicates the compromised state or condition, e.g., signaling incoming to the NEF 30 from an AS 14 that supports one or more of the software applications that run on the communication device 12.

While not so limited, such detection offers particular advantages in the context of mass deployments of embedded communication devices, such as MTC or IoT devices. Correspondingly, in at least one embodiment, the network 10 communicatively couples an Internet-of-Things (IoT) device, as the communication device 12 of interest, to an IoT AS, as the AS 14 of interest. Broadly, the network 10 may support vast numbers—millions—of IoT-based communication devices 12, where those devices may be of varying types with varying characteristic behaviors and, possibly, with multiple segregations of the communication devices 12, in terms of affiliated third-party owners, application or service types, device types or categories, etc.

In any of the above embodiments of the NEF 30, or in a further embodiment of the NEF 30, the NEF 30 is configured to provide communication-activity data for the communication device 12 to the AS 14. The communication-activity data indicates, in at least one embodiment, control-plane events in the communication network 10 involving the communication device 12. As such, the information enables the AS 14 to detect the communication device 12 as being compromised, based on the AS 14 detecting anomalous control-plane activity involving the communication device 12. The AS 14 can then, for example, send signaling towards the NEF 30, indicating that the communication device 12 is compromised.

In at least one embodiment, the NEF 30 as described above is a "first" NEF 30-1, and the processing circuitry 66 in the same or another network node 24 implements a "second" NEF 30-2 that is associated with the quarantine network slice 54 to which the communication device 12 has been moved. The NEF 30-2 is configured to receive an indication from the AS 14 that the compromise of the communication device 12 is ended, and, responsive to receiving the indication, initiate recovery operations to return the communication device 12 to the first network slice 50, for management of the communication device 12 as an uncompromised device. The recovery operations include the NEF 30-2 sending a further request to the NSSF 32, to initiate re-registration of the communication device 12 with the network 10, for re-connection of the communication device 12 to the network 10 via the first network slice 50.

In an extension of the foregoing operations, a NEF 30 is configured to initiate recovery operations for a communication device 12 previously moved to a quarantine network slice 54. For example, a NEF 30-1 initiates quarantine operations for the communication device 12, based on determining that the communication device 12 is a compromised device, and, later, upon a determination that the communication device 12 is no longer deemed to be compromised, a second NEF 30-2 initiates recovery operations for the communication device 12. The two NEFs 30-1 and 30-2 may be functionally separate but both be instantiated in the processing circuitry 66 of a single network node 24, or a single NEF 30 may be configured to perform both quarantine and recovery operations, e.g., based on a mapping or association between NEFs 30 and respective regular network slices 50 and/or respective quarantine network slices 54.

Further, a NEF 30 may be configured such that, after initiating recovery operations for a communication device 12, the NEF 30 sends a return indication to the ASss) 14 that is/are associated with the communication 12, responsive to detecting the communication device 12 re-connecting to the network 10 via a regular network slice 50. Still further, NEF operations and related operations, e.g., by a supporting NSSF 32 recovery operations may be prioritized.

Consider, for example, a case where a communication device 12 operating in a quarantine network slice 54 is one among two or more communication devices 12 that were moved to the quarantine network slice 54 as compromised devices but are now determined to be uncompromised, such that they should be returned to the regular network slice(s) 50 associated with them. In an advantageous arrangement, the processing circuitry 66 acting as the involved NEF 30 is configured to prioritize the performance of the recovery operations for at least one of the two or more communication devices 12, based on comparing a communication criticality metric or a financial metric associated with the one or more application services used by each of the two or more communication devices 12.

Such information may come to the NEF 30 from another function in the CN 18, or the NEF 30 may be configured to retrieve such information from a data store in the CN 18. Examples of communication criticality metrics include, for example, information about whether the individual communication devices 12 are involved in safety-related applications, critical control or monitoring applications, or may include information about QoS requirements associated with them. Examples of financial metrics may include a grade or rating regarding the business importance of the application(s) run by the respective communication devices 12, in terms of revenue to the operator of the network 10, or may include business-agreement data, such as an importance rank or grade defined in an SLA, and recorded in the network as prioritization data. In any case, the request sent from a NEF 30 to an NSSF 32 to initiate recovery includes, in one or more embodiments, an indication that the further request is a recovery operation, for use by the NSSF 32 in prioritizing the further request.

In at least one embodiment or in at least one operational scenario, the quarantine network slice 54 to which a communication device 12 is moved is user-group specific. As such, the NEF 30 that initiates the quarantine is configured to determine a group affiliation of the communication device 12 and select the quarantine network slice 54 from among a set 56 of two or more available network slices 54 defined for quarantine use, based on the group affiliation of the communication device 12. Additionally, or alternatively, the quarantine network slice 54 is specific to a network area of the network 10, and the NEF 30 is configured to determine a network location of the communication device 12, e.g., based on which access node 22 or access nodes 22 of the network 10 the communication device 12 is communicatively coupled to, and select the quarantine network slice 54 from among a set 56 of two or more available network slices 54 defined for quarantine use, based on the network area that includes the network location.

Figures 4, 5, 6, 7:
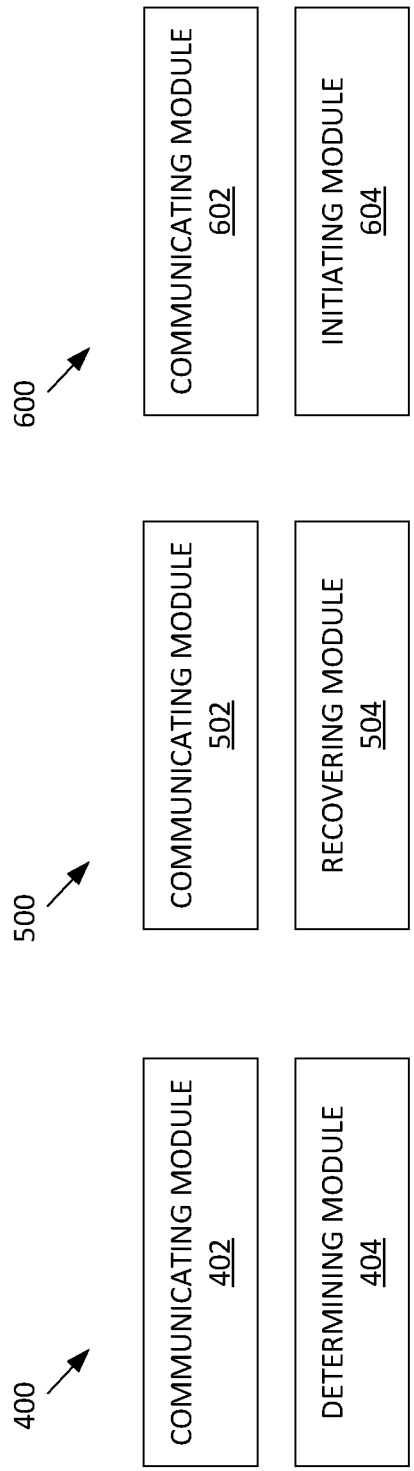
FIGS. 4-7 are block diagrams of example implementations of certain network functions that are directly or indirectly involved in managing compromised communication devices in a communication network.

While FIG. 3 depicted example arrangements of circuitry for implementation of a network node 24, FIG. 4 depicts another embodiment of a network node 24 in terms of its implementation via a number of processing modules or units. The processing modules or units comprise, for example, one or more software-configured microprocessors or other digital processors, such as Application Specific Integrated Circuits (ASICs), Field Programmable Gate Arrays (FPGAs), etc. In at least one embodiment, the processing modules or units are instantiated as virtualized processing modules in a data center or other cloud-computing environment, such as may be included in or coupled to the CN 18 of the network 10.

In particular, FIG. 4 illustrates a set 400 of functional modules, for implementation of the NEF 30, as described above. The set 400 includes a communicating module 402 that is configured to communicatively couple the NEF 30 with an AS 14 that supports one or more application services used by a communication device 12 that communicatively couples with the AS 14 via a first network slice 50 provided by the communication network 10. The set 400 further includes a determining module 404 that is configured to determine that the communication device 12 is compromised, based on detecting a device anomaly regarding the communication device 12, the device anomaly being an anomalous state or behavior of the communication device 12, or based on receiving signaling incoming from the AS 14, indicating that the communication device (12) is compromised.

Further, the set 400 includes a quarantining module 406 that is configured to initiate quarantine operations to move the communication device 12 from the first network slice 50 to a second network slice 54, for management of the communication device 12 as a compromised device. The second network slice 54 is referred to as a quarantine network slice 54 and the quarantine operations are initiated by the quarantining module 406 responsive to the determination that the communication device 12 is compromised. Quarantining operations include sending a request to an NSSF 32, to initiate re-registration of the communication device 12 with the network 10, for re-connection of the communication device 12 to the network 10 via the quarantine network slice 54.

FIG. 5 depicts another set 500 of processing modules, implemented either in the same NEF 30 at issue in FIG. 4, or in another NEF 30 that supports recovery of a compromised communication device 12 from a quarantine network slice 54. The set 500 of processing modules includes a communicating module 502 that is configured to receive an indication from an AS 14 that the compromise of the communication device 12 is ended. Further included in the set 500 is a recovering module 504 that is configured to respond to the received indication by initiating recovery operations to return the communication device 12 to a first network slice 50, a regular slice, for management of the communication device 12 as an uncompromised device. The recovery operations include the NEF 30 sending a request to the involved NSSF 32, to initiate re-registration of the communication device 12 with the network 10, for re-connection of the communication device 12 to the network 10 via the regular network slice 50. The regular network slice 50 to which the communication device 12 is recovered may be a default regular network slice 50, or a particular selected one, such as the one it was removed from.

FIG. 6 illustrates a set 600 of processing modules, e.g., implemented via the processing circuitry 66 of a network node 24 operative as an NSSF 32 that provides support for quarantining a communication device 12. The set 600 includes a communicating module 602 that is configured to receive a request from a NEF 30, to initiate re-registration of the communication device 12 with the network 10, for re-connection of the communication device 12 to the network 10 via a quarantine network slice 54. That is, the request refers to a communication device 12 currently assigned to a first network slice 50 defined as a regular network slice, and the request requests reconnection of the communication device 12 to a second network slice 54 defined as a quarantine network slice. Correspondingly, the set 600 of processing modules includes an initiating module 604 that is configured to trigger the re-registration by sending signaling towards the supporting AMF 34, requesting the AMF 34 to initiate re-registration of the communication device 12. The NSSF 32 then exchanges signaling with the AMF 34 regarding slice selection, for connection of the communication device 12 to the quarantine network slice 54.

FIG. 7 illustrates a set 700 of processing modules, e.g., implemented via the processing circuitry 66 of a network node 24 operative as an AMF 34 that provides support for quarantining a communication device 12. The set 700 includes a communicating module 702 that is configured to receive signaling from an NSSF 32, initiating re-registration of the communication device 12, such that the communication device 12 is disconnected from its current, regular network slice 50 and reconnected to a quarantine network slice 54. The set 700 further includes a registration module 704 that is configured to perform the registration/re-registration operations, for moving the communication device 12 from the regular network slice 50 to the quarantine network slice 54, with such operations including exchanging slice-selection information with the NSSF 32.

Figure 8:
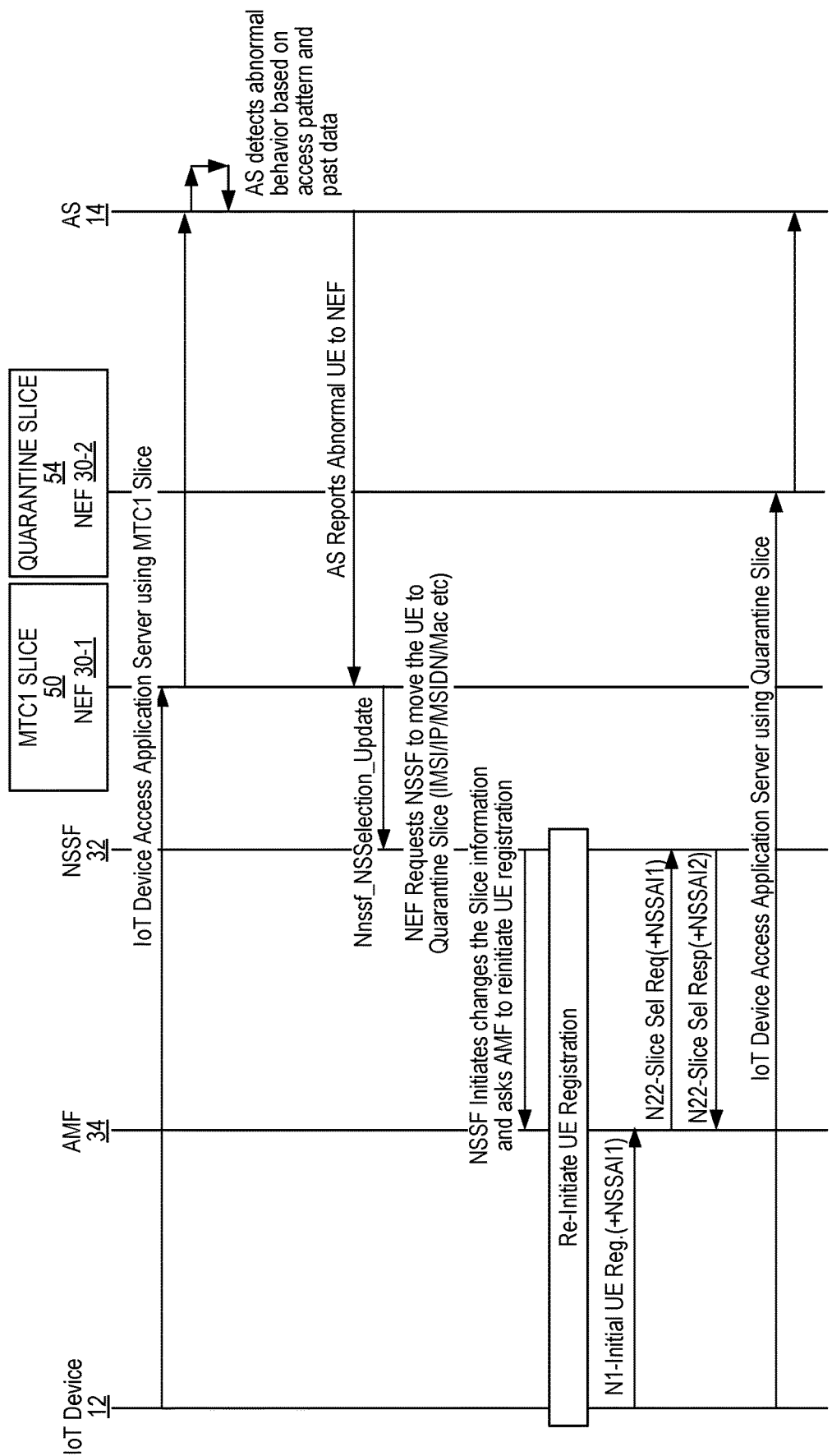
FIG. 8 is a signaling flow diagram of one embodiment of signaling and related operations carried out by respective network functions, for quarantining a communication device determined to be compromised.

FIG. 8 depicts an example signaling flow diagram corresponding to one implementation of the above-detailed quarantining operations by and between a NEFs 30-1, a NEF 30-2, an NSSF 32, and an AMF 34. A communication device 12, depicted as an IoT device and also referred to as a "UE" in the signaling diagram, accesses an AS 14 using a regular network slice 50, depicted as a slice configured for Machine Type Communication (MTC). The NEF 30-1 provides exposure functions and supporting operations with respect to the AS 14, e.g., by providing user-plane and/or control-plane activity information, which allows the AS 14 to detect abnormal behavior by the communication device 12.

The AS 14 reports the abnormal behavior to the NEF 30-1, e.g., it sends signaling indicating that the communication device 12 is deemed to be compromised. In response, the NEF 30-1 requests that the NSSF 32 move the communication device 12 to the quarantine network slice 54. Identification of the communication device 12 in such signaling comprises, for example, any of an IMSI, an IP address, an MSIDN, a MAC address, etc.

The NSSF 32 responds to the request from the NEF 30-1 by initiating a change of the slice information associated with the communication device 12 and requesting the AMF 34 to initiate reregistration of the communication device 12. In response, the AMF 34 initiates reregistration of the communication device 12, and it may receive Network Slice Selection Assistance Information (NSSAI) from the communication device 12 as part of the reconnection signaling. The AMF 34 provides the NSSAI to the NSSF 32, which provides a slice selection in response—i.e., the quarantine slice selection information, for connection of the communication device 12 to the AS 14 via the selected quarantine network slice 54.

Figure 9:
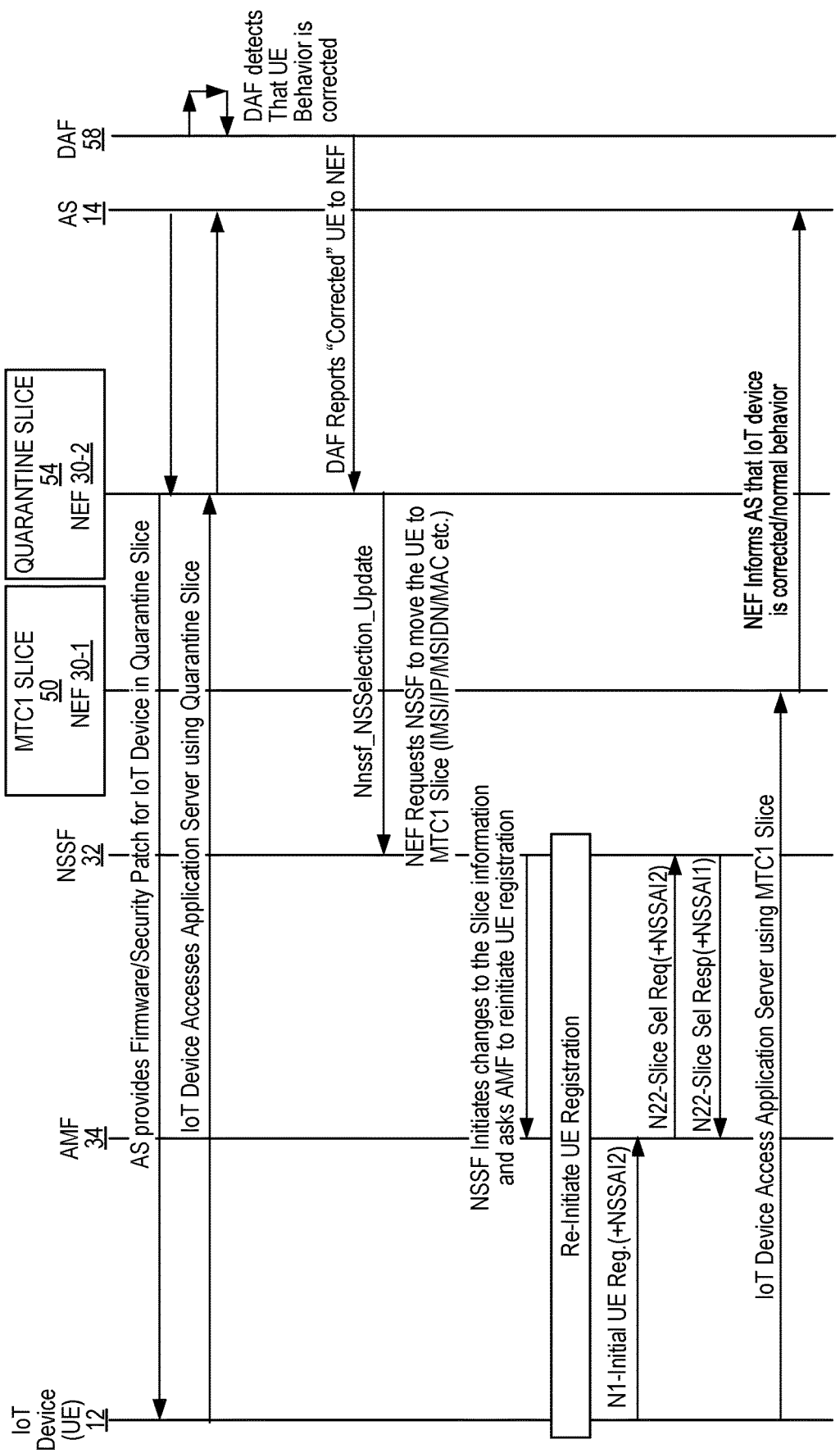
FIG. 9 is a signaling flow diagram of one embodiment of signaling and related operations carried out by respective network functions, for recovering a previously-quarantined communication device.

FIG. 9 depicts an example signaling flow diagram for one embodiment of the above-described recovery operations by and between a NEF 30-1, a NEF 30-2, an NSSF 32, an AMF 34, and a Data Analytics Function (DAF) 58, which may be implemented in the network 10 in centralized or distributed fashion. Alternatively, the AS 14 incorporates or is associated with the DAF 58. As a starting state for understanding the signaling flow, the communication device 12 was previously deemed to be compromised and moved to a quarantine network slice 54.

The AS 14 takes corrective action to end the compromised condition of the communication device 12, such as by sending a software or firmware patch to the communication device 12, via the NEF 30-2 managing the quarantine network slice 54. The communication device 12 updates its software or firmware (with "software" being used broadly to encompass either or both) and communicates with the AS 14 after updating.

The AS 14 or DAF 58 recognizes that the communication device 12 is updated and deems the compromised condition to be cleared and sends an indication to the NEF 30-2 that the communication device 12 has been corrected. The NEF 30-2 responds by contacting the NSSF 32, requesting that the communication device 12 be recovered, i.e., returned to a regular or normal network slice 50, such as the prior regular network slice 50 used for the communication device 12, a newly selected regular network slice 50, or a default regular network slice 50. In one or more cases, the type or identity of the communication device 12, or the identity or affiliation of the AS 14 determines the regular network slice 50 to which the communication device 12 is recovered.

The NSSF 32 initiates a recovery or return of the communication device 12 to a regular network slice 50, by sending slice information to the AMF 34, with corresponding slice information. The AMF 34 responds to the signaling from the NSSF 32 by initiating re-registration of the communication device 12, wherein the communication device 12 disconnects from the quarantine slice 54 and re-registers with the network 10, during which re-connection the AMF 34 and NSSF 32 cooperate to assign the communication device to the regular network slice 50. Either the NEF 30-2 or the NEF 30-1 informs the AS 14 that the communication device 12 is reconnected to the network 10 as a normal or uncompromised device.

Thus, in one or more embodiments, the DAF 58 serves as an intelligent database for holding information that would not normally be available in an operator's communication network. In at least one embodiment, the DAF 58 collects or otherwise holds any one or more of: template or characteristic data that can be used to detect aberrant operation by a device 12; historical data collected by or provided to the DAF 58, to establish usage or other behavior patterns for use in detecting aberrant device behavior; statistical data or pattern data derived from historical behavior data for use in detecting aberrant device behavior; third-party blacklist information; security-alert information etc. Behavior data may include user-plane and/or control-plane data, and information may be held for individual devices 12 and/or groups of devices 12 and/or types of devices 12 and/or categories of devices 12.

Further, in at least one embodiment, the DAF 58 provides or otherwise facilitates "correcting" a communication device 12 that has been determined to be compromised. For example, by supporting the firmware updating of a device 12 or otherwise confirming that the firmware update has been performed at the device 12. The DAF 58 may report "corrected" devices 12 to the NEF 30, for reinstatement (reconnection) of the corrected device 12 to a normal network slice—i.e., for movement of the corrected device 12 from a quarantine slice to its normal slice.

Figure 10:
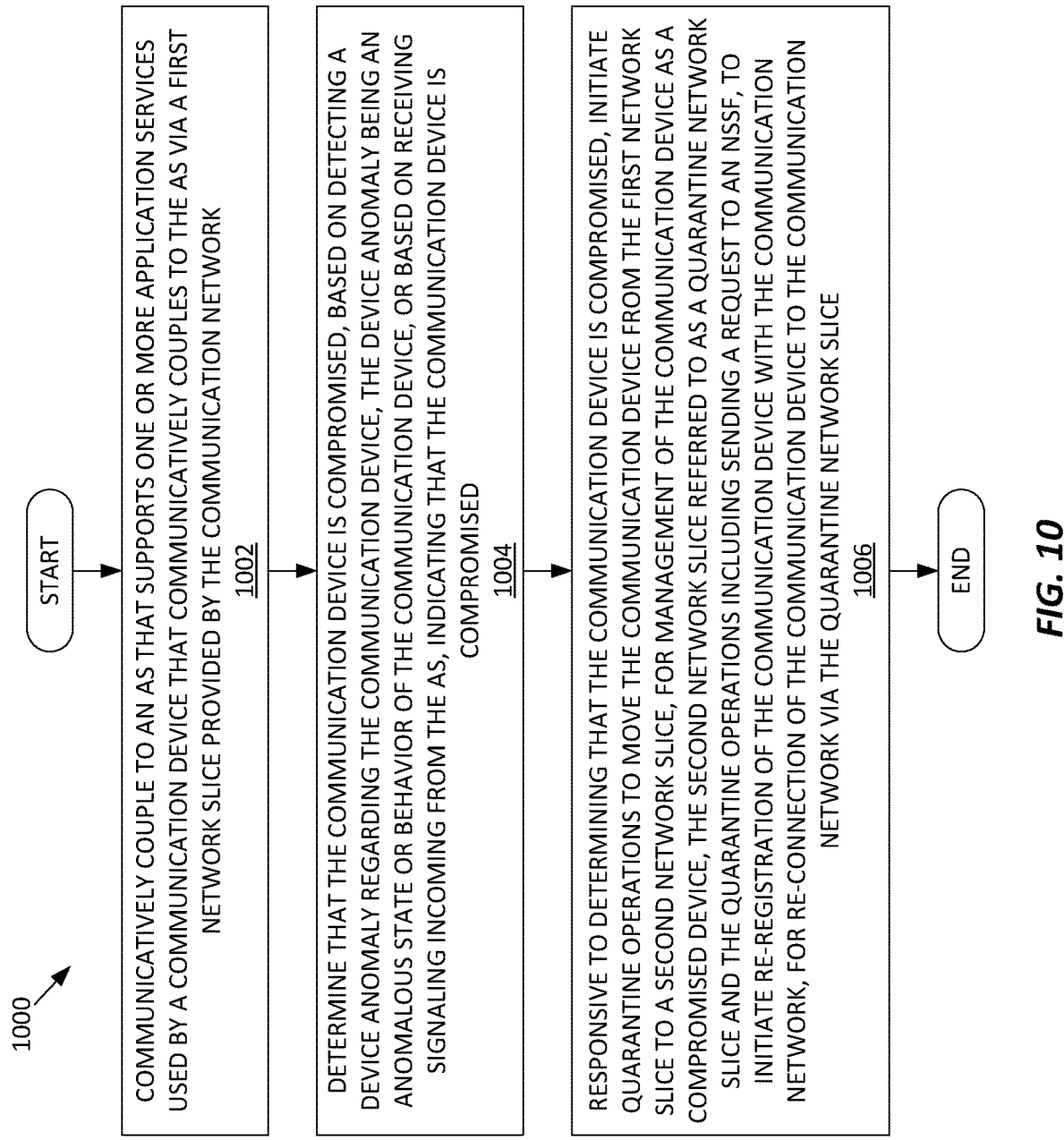
FIG. 10 is a logic flow diagram of one embodiment of a method of operation by a network node operating as a Network Exposure Function (NEF) in a communication network.

FIG. 10 depicts a method 1000 of operation by a NEF 30, e.g., as realized via a network node 24 with correspondingly configured processing circuitry 66, whereby the NEF 30 quarantines a communication device 12 that is determined to be compromised. The method 1000 provides for managing compromised devices 12 in a communication network, e.g., in the network 10. In at least one embodiment, the method 1000 is performed by one or more network nodes 24 implementing a NEF 30 in the network 10.

The method 1000 includes the NEF 30 communicatively coupling (Block 1002) with an AS 14 that supports one or more application services used by a communication device 12 that communicatively couples with the AS 14 via a first network slice 50 provided by the network 10. Further, the method 1000 includes determining (Block 1004) that the communication device 12 is compromised, based on detecting a device anomaly regarding the communication device 12, the device anomaly being an anomalous state or behavior of the communication device 12. Alternatively, the determining is based on the NEF 30 receiving signaling incoming from the AS 14, indicating that the communication device 12 is compromised.

Further, the method 1000 includes, in response to determining that the communication device 12 is compromised, the NEF 30 initiating (Block 1006) quarantine operations to move the communication device 12 from the first network slice 50 to a second network slice 54, for management of the communication device 12 as a compromised device. The second network slice 54 is referred to as a quarantine network slice 54 and the quarantine operations include sending a request to an NSSF 32, to initiate re-registration of the communication device 12 with the network 10, for re-connection of the communication device 12 to the network 10 via the quarantine network slice 54.

The one or more network nodes 24 may further implement the NSSF 32, where the NSSF 32 responds to the request from the NEF 30 by updating slice information for the communication device 12. The update indicates the quarantine network slice 54, and NSSF 32 sends signaling to a supporting AMF 34 of the network 10. The signaling indicates to the AMF 34 to initiate the re-registration of the communication device 12, including indicating that the quarantine network slice 54 should be selected for the communication device 12. Note that subscription information associated with the communication device 12 or information associated with the involved AS 14 may determine the regular network slice(s) 50 used for the communication device 12 and/or may determine the quarantine network slice 54 used for the communication device 12.

As for detecting in a device anomaly of a communication device 12, in one or more embodiments the NEF 30 detects, as an anomalous state of the communication device 12, an incorrect software identifier or software fingerprint for a software application running in the communication device 12 in support of the one or more application services used by the communication device 12. The detection is, for example, based on comparing a detected software identifier or a detected software fingerprint for the communication device 12 with a stored software identifier or a stored software fingerprint held in the communication network 10 for the communication device 12.

In the same or another embodiment of the method 1000, detecting a device anomaly comprises detecting, as anomalous behavior by a communication device 12, anomalous communication activity by the communication device 12 in the network 10. Such detection is based on, for example, detecting a deviation by the communication device 12 from historic or characteristic communication activity, as known from corresponding information stored in the network 10 for the communication device 12. The anomalous communication activity comprises user-plane and/or control-plane activity, in an example implementation. Correspondingly, detecting the deviation comprises evaluating historic communication-activity data collected in the network 10 for the communication device 12 and discerning one or more user-plane or control-plane events involving the communication device 12 that are anomalous relative to a normative pattern established by the historic communication-data activity.

In one or more embodiments, the method 1000 includes the NEF 30 providing communication-activity data for the communication device 12 to the AS 14, For example, the communication-activity data indicates control-plane events in the network 10 involving the communication device 12, and thereby enables the AS 14 to detect the communication device 12 as being compromised, based on the AS 14 detecting anomalous control-plane activity involving the communication device 12.

In one or more embodiments, the NEF 30 comprises a first NEF 30-1, e.g., associated with the regular network slice 50 associated with the communication device 12 that has been determined to be compromised. Correspondingly, the method 1000 further comprises the first NEF 30-1, or a second NEF 30-2 that is associated with the quarantine network slice 54, receiving an indication from the AS 14 that the compromise of the communication device 12 is ended. In response, that NEF 30 initiates recovery operations to return the communication device 12 to the first network slice 50, for management of the communication device 12 as an uncompromised device. The recovery operations including sending a further request to the NSSF 32, to initiate re-registration of the communication device 12 with the network 10, for re-connection of the communication device 12 to the network 10 via the first network slice 50.

In this context, the communication device 12 may be one among two or more communication devices 12 that are (have been) moved to the quarantine network slice 54 as compromised devices. In at least one implementation of the method 1000, the method 1000 further includes prioritizing the performance of the recovery operations for at least one of the two or more communication devices 12, based on comparing a communication criticality metric or a financial metric associated with the one or more application services used by each of the two or more communication devices 12. Thus, when the involved NEF 30 initiates the recovery operations, such operations may include the NEF 30 indicating that the request to the NSSF 32 to change the communication device 12 from a quarantine network slice 54 to a regular network slice 50 is a recovery operation. Such information allows the NSSF 32 to prioritize recovery of a communication device 12 back to a regular network slice 50, and may include the NSSF 32 propagating the recovery indication to the supporting AMF 34, to trigger prioritization of the device re-registration operations at the AMF 34.

One or more implementations of the method 1000 also include, as part of device recovery operations, the involved NEF 30 sending a return indication to the AS 14, responsive to detecting the communication device 12 re-connecting to the network 10 via the first network slice 50.

Further, in at least one embodiment, the quarantine network slice 54 to which a compromised communication device 12 is moved is user-group specific, and the method 1000 further includes the involved NEF 30 and/or NSSF 32 determining a group affiliation of the communication device 12 and selecting the quarantine network slice 54 from among a set 56 of two or more available network slices 54 defined for quarantine use, based on the group affiliation of the communication device 12. Additionally, or alternatively, the quarantine network slice 54 to which a compromised communication device 12 is moved is specific to a network area of the communication network 10. Correspondingly, the method 1000 further comprises determining a network location of the communication device 12, based on which access node 22 or access nodes 22 of the network 10 the communication device 12 is communicatively coupled to, and selecting the quarantine network slice 54 from among a set 56 of two or more available network slices 54 defined for quarantine use, based on the network area including the network location.

An earlier point regarded the applicability of the techniques described herein to multiple types or kinds of networks. For example, the 5G Service Based Architecture (SBA) introduces NEFs, which can be understood as an enhanced version of the Service Capability Exposure Function (SCEF) defined in 4G networks. Again, see 3GPP TS 23.501 for reference details regarding the system architecture defined for networks based on 5G.

Among the general operations and features of a NEF in a 5G network, the NET: supports exposure of network capabilities and events to other network function and to external function, e.g., third-party servers, edge-computing applications, etc.; stores and retrieves information as structured data using a standardized interface (Nudr) to a UDM that is within the same Public Land Mobile Network (PLMN) as the NEF; provides secure provision of information from external applications into the network; provides mechanisms for AFs to securely provide information to the network, such as information indicating expected or characteristic behavior for a communication device 12, or for specific groups, types, kinds, or categories of communication devices 12; assistance in throttling AFs; translation of information exchanged with AFs, including external ASs, such as translating between an AF-Service-Identifier and internal 5G Core information such as DNN, S-NSSAI; and provides for masking of network and user sensitive information to external AFs/Ass, according to the network policy. Here, "AF" can be understood as being synonymous with "AS" for Application Server, or can be understood as referring to a particular functionality provided by a server.

Additionally, a NEF provides for the reception of information from other network functions (based on exposed capabilities of other network functions). NEFs store the received information as structured data using a standardized interface to a Unified Data Repository (UDR). The stored information can be accessed and "re-exposed" by the NEF to other network functions and AFs, and used for other purposes, such as analytics. A NEF may also support a Packet Flow Description (PFD) function that stores and retrieves PFD(s) in/from the UDR, and provides PFD(s) to SMFs on request, or responsive to PFD management by the NEF, such as described in 3GPP TS 23.503.

To enable massive IoT expansion, operators will need to embrace the Low Power Wide Area (LPWA) technologies, such as NB-IoT and LTE Cat-M1/M2. IoT devices require small data transfers, and the 3GPP has determined that delivery via the control plane is much preferred over using the data plane. In Release 13, the 3GPP proposes that the SCEF be used for Non IP Data Delivery (NIDD), as the preferred mechanism for small amounts of data to be transferred between IoT devices and ASs. 3GPP has made NIDD a requirement for small data transfers. And, as noted earlier, with the push towards millions of such devices relying on communication networks for access and connectivity to associated ASs, such networks will experience new and more sweeping security threats. For example, Machine-to-Machine (M2M) devices may be hacked, such as where a hacked smart meter is altered to connect to the communication network more frequently than planned for or is altered to send more data than is planned for. The techniques disclosed herein, including the various alternatives and extensions, allow the involved communication network to preempt untoward behaviors or patterns of behavior. For example, a communication network 10 has a NEF 30 configured according to the details disclosed herein, such that the NEF 30 plays a pivotal role in safeguarding the network 10, e.g., cooperating with an AS 14 in early detection of a compromised communication device 12 operating in the network 10.

The NEF 30 (or SCEF) interacts with a DAF 58, for example, to proactively start collecting relevant information for detecting compromise of the communication device 10, and, if needed, triggering relocation of the communication device 12 to a quarantine network slice 54, for ongoing session or post session closure. Assume, for example, that an IoT device is identified as being compromised, with two corresponding options for the network: (A) change the IoT device to latch/attach to another network slice for the ongoing session (e.g., while data is being transferred, like device logs, etc.), or (B) change the IoT device to latch/attach to a new network slice, e.g., a quarantine slice, once the current session is over.

While such operations may have particular advantages in the context of supporting large numbers of MTC/IoT devices that use the NIDD protocol or other arrangements for control-plane based exchanges of data, the operations are also relevant to user-plane data operations.

The disclosed techniques offer significant advantages for the network 10 and its users. For example, upon a NEF 30 determining that a communication device 12 is compromised, the NEF 30 quarantines the communication device 12 by initiating re-registration of the device 12 from a regular network slice 50 to a quarantine network slice 54. With that sort of control applied across potentially large populations of devices 12, the network 10 avoids or greatly reduces expensive signaling and traffic choking overhead. In additional to providing segregation advantages, quarantining provides opportunities for additional data collection and control.

For example, a quarantine network slice 54 may have additional network functions instantiated in it, such as firewall functions, antivirus functions, or other functions that limit the spreading of malicious content and choking of the network 10. Further, the quarantine network slice 54 in one or more embodiments provides for additional or more comprehensive data logging as regards the operation of communication devices 12 that are connected to the quarantine network slice 54. Artificial Intelligence (AI) based evaluation of logged data provides, for example, a mechanism for further analysis of the compromise details, and may allow fingerprinting or other characterization of altered software or other aberrations underlying the compromised condition of the communication device(s) 12.

Overall, the network 30 can be understood as providing or otherwise supporting management of compromised devices 12, including proactive action, such as quarantining via forced re-registration, and facilitating recognition of compromised devices 12 within the network 12, along with subsequent recovery of previously-compromised devices 12 that have been returned to a normal condition (uncompromised condition).

In at least one embodiment, one or more NEFs 30 in the network 10 are configured to perform operations that may be characterized as a pre-collection phase. Such operations include, for example, populating the relevant information in the network domain to detect the abnormal behavior pattern/historical data of IoT devices or other communication devices 12. The NEF 30 or another function in the network 10, such as a DAF 58, collects connectivity, signaling and user data patterns or statistics for respective communication devices 12 that are presumed to be operating normally in the network 10.

In one example of user-plane data population, a NEF 30, e.g., with an integrated DAF 58, captures IoT data, including user-plane data as part of NIDD, e.g., using lawful interception, and thereby populates a database entry or entries with user-plane information for analysis or reference for detecting uncharacteristic behavior. Capture may apply to multiple data types. Alternatively, a DAF 58 implemented apart from the NEF 30 may provide for such collection.

In one example of control-plane data population, a NEF 30 or DAF 58 captures connectivity patterns for IoT devices and/or other types of communication devices 12, for use in establishing normative patterns that can then be used later for identifying aberrant behavior. One example of aberrant connectivity behavior by a communication device 12 is excessive handover, e.g., ping-ponging across cell boundaries in the network 10.

Other data collection activities may include collecting data related to Business Service Systems (BSS), such as may be used for prioritizing the recovery of compromised devices 12. Additionally, revenue-related information may be collected and used for non-real-time analysis of revenue loss due to devices 12 being compromised, or attendant issues with SLA commitments, etc.

A NEF 30 or DAF 58 in the network 10 also may receive information from external sources, such as global security repositories and antivirus systems, for detection of compromised devices 12. For example, detection is based on recognizing characteristic data or behavior patterns that have been previously characterized as constituting compromised behavior. Such information may come from operating system and software companies, such from Microsoft, etc., and such as alerts from the Product Security Incident Response Team (PSIRT) maintained by IBM.

In a post-collection phase following pre-collection operations, the pre-collection information may be used to detect aberrant behavior by communication devices 12 that are operating in the network 10. Of course, as new communication devices 12 or new types of communication devices 12 are subscribed to or become active in the network 10, additional collections may occur. That is, the network 10 in at least some embodiments continuously or repeatedly collects data that is then used for detecting communication devices 12 that are compromised devices 12. AI or other machine-learning algorithms may be applied to the data collections, e.g., for establishing normative behavior, identifying aberrant behavior, identifying activity trends, etc.

In the post-collection or active management phase, the network 10 may take immediate action to quarantine a communication device 12 that has been determined to be compromised. The quarantine operations may be triggered for the current communication session—e.g., the communication device 12 is question is currently connected to and registered with the network 10 and the communication device 12 is engaged in a communication session, and the quarantine operations are triggered while the current session is ongoing. Alternatively, an identifier associated with the communication device 12 may be flagged or otherwise remembered, with the flag used to trigger quarantining of the communication device 12 upon its next communication-session establishment.

As noted, a NEF 30, a DAF 58, and/or other network functions within the network 10 may continue collecting operational information for compromised communication devices 12, e.g., to better understand and characterize their compromised conditions. Such collection can also be used to determine whether a compromised device 12 begins returning to normal operation or continues degrading.

Understanding the compromised behavior of a communication device 12 allows, for example, the network 10 to characterize or classify the compromise, with each such classification then being linked or mapped to a correspondingly defined remedial action, or otherwise linked to the most probable remedy. In one example, at least some types of compromised behavior result in the involved communication devices 12 being flagged for software updating. Such information or related information regarding compromised behavior also allows the network to assess the revenue effects of compromises, and to determine network updates to decrease future vulnerabilities to compromise.

Figure 11:
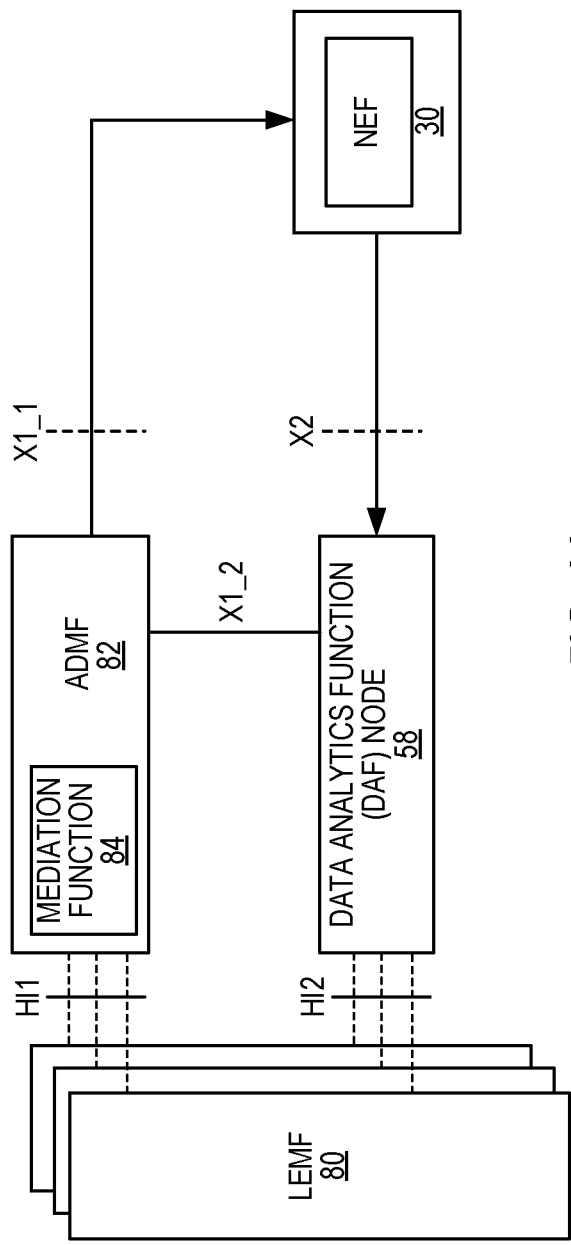
FIG. 11 is a block diagram of one embodiment of an analytics node and related functions, as may be used to provide behavioral data or other information to a NEF, regarding the operation of a communication device in a communication network.

FIG. 11 illustrates example details for the network 10, for pre-collection of data useful for identifying communication devices 12 as being compromised, and for ongoing collection of data over time, in relation to given communication devices 12 operating in the network 10, e.g., for further learning of behavioral characteristics constituting normative behaviors for particular communication devices 12, or particular groups of communication devices 12, or particular types or categories of communication devices 12.

A Law Enforcement Management Function (LEMF) 80 interfaces with an Administration Function (ADMF) 82 with an included Mediation Function 84. The LEMF 80 also interfaces with the aforementioned DAF 58 (analytics function), in at least some embodiments of the network 10. The LEMF 80 provides an interface for collecting user-plane data exchanged with communication devices 12 via the network 10, which data may be collected in whole or in part for developing an historic record. Additionally, or alternatively, the data may be processed for the development of statistical representations, such as average payload or transmission size, etc., Developing information about the communication patterns of given communication devices 12 or groups or types thereof provides the network 10 with a frame of reference for detecting deviations from such norms—i.e., aberrant behaviors.

User-plane information may be provided to a NEF 30 in the network 10 from the LEMF 80/ADMF 82 over a defined interface similar to the "X2" interface defined for a Home Subscriber Server (HSS) in 3GPP TS 33.107. The user-plane information of IoT devices will be similar to the parameters specified in OMA Device Web API (OMA-ER-Device_WebAPIs-V1_0-20160419-C), where "OMA" denotes the Open Mobile Alliance.

An example user-plane message structure is as follows, where the example assumes an IoT device configured for blood pressure monitoring:

Sequence 1

{
  "Type"
  "Metric-Id"
  "Supplemental - Types"
  "Nu-Observed Value"
  "Unit-Code"
  "productName" - ABC Blood Pressure Pro
  "manufacturerName" - ABC Inc.
  "modelNumber" - TP-001
  "firmwareRevision" - rev.1.001.003
  "serialNumber" - 01234-5678-9ABCD-EF01

-continued

Sequence 1

"softwareRevision" - rev.2.000.000
  "hardwareRevision" - rev.1.0
  "partNumber" - 002
  "protocolRevision" - rev.3.1
  "systemId" - ABCDEF0123456789
  "batteryLevel" - 0.6
}

The "Type" Key value specifies the Sensor information type (OMA specification mentions as Medical Device Communication) as the key value.

The "Metric-Id" Key value specifies MDC type subcode as specified in OMA Specification.

The "Nu-ObservedValue" Key value specifies the Sensor information value, e.g., temperature, pulse rate, Weight, Humidity, Voltage, Blood Pressure etc.

The "Unit-Code" specifies the units information for the specified Observed Value.

The above device information is taken as an example specified in OMA specification OMA-TS-Blood_Pressure_Monitor_APIs-V1_0-20160419-C Additionally, or alternatively, the network 10 is configured for capturing control-plane and network-level information. Consider a case where a given AS 14 sends signaling to a NEF 30 in the network 10, triggering the NEF 30 to send a monitoring request message to an HSS/UDM in the network 10, to initiate a Subscriber Data Request from a Mobility Management Entity (MME) associated with the communication device 12 targeted by the request. In response, the MME returns RAN-related details for the communication device 12 to the HSS/UDM via the Sha interface, e.g., as an additional parameter set. See 3GPP TS 29.272 for relevant interface details, where the NEF 30 may use the S6t interface to send the request towards the HSS/UDM. An example request usable for requesting the HSS to capture information for a particular communication device 12 is as follows:

Sequence 2

{
  IMEI
  3GPP2-MEID
  Software-Version
  Equipment-Status
  Network-Access-Mode
  Time-Zone
  Daylight-Saving-Time
  Subscription-Data-Flags
  UE-Reachability-Configuration
  Last-UE-Activity-Time
  User-State
  MME-User-State
  MME-Location-Information
  Subscribed-Periodic-RAU-TAU-Timer
  MDT-Configuration
  EPS-Subscribed-QoS-Profile
  Access-Restriction-Data
  PDN-Connection-Continuity
  eDRX-Cycle-Length
}

Some important parameters captured via the foregoing operations include but are not limited to software-version/firmware, eDRX-cycle-length, IMEI, and subscriber revenue. The IMEI may, for example, be checked against blacklist records stored in the network 10. Further, while the details above make use of certain network names or jargon that may be specific to particular types of generations of communication networks. However, it shall be understood that the techniques disclosed herein have broad applicability and that networks of different types or generations may include analogous or similar functions and functionality germane to the techniques disclosed herein. For example, while MMEs may support certain network monitoring in a 4G network context, Access and Mobility Management Functions (AMFs) may provide the same or similar monitoring in a 5G network context.

Figure 12:
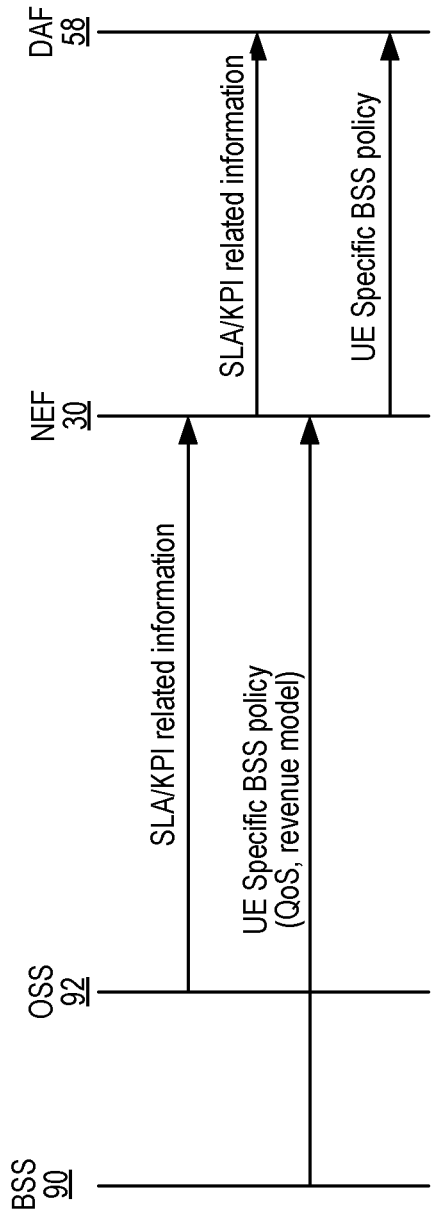
FIGS. 12 and 13 are further signaling flow diagrams illustrating example signaling flows associated with various aspects of managing compromised communication devices in a communication network.

As for BSS and SLA related information, such data may be populated at a NEF 30 or supporting DAF 58 in several ways. FIG. 12 illustrates an example signaling flow that provides for the population of such information at a DAF 58 in the network 10. Illustrated entities or functions include the aforementioned NEF 30 and DAF 58, along with a Business Support System (BSS) node 90, and an Operations Support System (OSS) node 92.

In an example implementation or operational scenario, the OSS node 92 provides service assurance information to the NEF 30, which provides it to the DAF 58, for collecting information related to one or more SLA provisions, such as Key Performance Indicators (KPIs). In at least one example, such information is used for prioritizing the operations needed to correct compromised communication devices 12. For example, the information stored for a given communication device 12 indicates that the corrective operations have a longer lead time, in relative terms, at least, or indicates that the communication device has a lower criticality or less business impact. The communication device 12 in question is, for example, a networked sensor that plays a non-critical role in agricultural operations.

In contrast, information stored for another communication device 12 indicates that it has a higher criticality, e.g., in terms of safety or business impact. Sensors used for critical seismic monitoring or machine control serve as examples of higher priority devices. Consequently, among a potentially large number of communication devices 12 being managed by the network 10 as compromised devices, the SLA/KPI related information provides the NEF 30 and/or other functions within the network 10 with the data needed to prioritize device corrections. Such corrections may involve, for example, global security patches populated at the DAF 58. Additionally, or alternatively, the various ASs 14 that are associated with respective communication devices 12 or groups of communication devices 12 may provide or apply the corrective patches.

Figure 13:

In at least one example implementation, the NEF 30 subscribes to one or more external security-alert systems, for information used for detection of compromised devices or identification of compromised devices. FIG. 13 illustrates an example arrangement, wherein the NEF 30 receives security information and/or corrected software patches or releases from one or more external security servers 94. The NEF 30 may, for example, forward such information and data to the DAF 58, for use in detecting and/or correcting communication devices 12 that are compromised.

And, as detailed herein, the NEF 30 initiates quarantine operations, for movement of communication devices 12 that are determined to be compromised, resulting in those devices being moved from their regular network slice(s) 50 into one or more quarantine network slices 54. The determination and corresponding quarantining are undertaken by the NEF 30 autonomously in one or more embodiments, while one or more other embodiments involve the NEF 30 receiving signaling from the involved ASs 14, indicating the compromised condition for respective communication devices 12 and initiating the quarantining operations by the NEF 30 and the supporting downstream functions, e.g., the involved NSSFs 32 and AMFs 34.

In an example case, an AS 14 concludes that one of the communication devices 12 affiliated with it is compromised, e.g., based on information forwarded to it by the NEF 30, and it transmits a message to the NEF, to take appropriate action. The Application Program Interface (API) supporting such interaction with the NEF 30 is, for example, a Representational State Transfer (REST)-based API and may use the Hypertext Transfer Protocol (HTTP). In at least some implementations, the NEF 30 may, in parallel, with the AS 14, work to identify compromised communication devices 12. As noted earlier, the NEF 30 is in an advantageous position to detect aberrant behavior within the network 10 that would not necessarily be apparent to the AS 14, unless exposed by the NEF 30.

In at least one implementation, as the NEF 30 and/or DAF 58 determine that individual communication devices are compromised, or as the NEF 30 and/or DAF 58 undertake corrective operations for such communication devices 12, the NEF 30 and/or DAF 58 uses information gleaned from or for the compromised devices 12 to search for other communication devices 12 that may be similarly compromised.

Determining that one or more communication devices 12 are compromised, for example, provides the NEF 30 and/or DAF 58 with some basis to suspect that other communication devices 12 that are in the same group or category as the compromised devices 12 may also be compromised. More broadly, there may be any number of commonalities or affiliations shared among a plurality of communication devices 12 and determining that one of them is compromised may trigger the NEF 30 and/or DAF 58 to look for evidence of compromise in one or more of the affiliated communication devices 12. Such operations include, for example, performing additional analysis of data collected for the affiliated devices 12, or increasing the amount or frequency or types of data collected for all affiliated devices 12, for accelerated detection of any spreading virus infection.

As another example, the software version and/or software application identifier(s) of a communication device 12 that has been determined to be compromised serves as information that can be used by the NEF 30 and/or DAF 58 to search for other communication devices 12 in the network 10 that also may be compromised. In another example, the traffic/signaling pattern associated with a communication device 12 that has been determined to be compromised serves as a template that can be used by the NEF 30 and/or DAF 58 to search for other communication devices 12 in the network that also may be compromised. In yet another example, the NEF 30 and/or DAF 58 search for possibly compromised communication devices 12 in a given network area or corresponding geographic location, once one or more communication devices 12 in the area or location have been determined to be compromised. Here, "searching" for compromised devices 12 may include, as noted, looking for similar patterns of behavior, applying enhanced scrutiny via more aggressive data collection, etc.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of managing compromised devices in a communication network, the method performed by one or more network nodes implementing a Network Exposure Function (NEF) in the communication network, and the method comprising:
   communicatively coupling with an Application Server (AS) that supports one or more application services used by a communication device that communicatively couples with the AS via a first network slice provided by the communication network;
   determining that the communication device is compromised, based on detecting a device anomaly regarding the communication device, the device anomaly being an anomalous state or behavior of the communication device, or based on receiving signaling incoming from the AS, indicating that the communication device is compromised; and
   responsive to determining that the communication device is compromised, initiating quarantine operations to move the communication device from the first network slice to a second network slice, for management of the communication device as a compromised device, the second network slice referred to as a quarantine network slice and the quarantine operations including sending a request to a Network Slice Selection Function (NSSF), to initiate re-registration of the communication device with the communication network, for re-connection of the communication device to the communication network via the quarantine network slice.

2. The method of claim 1, wherein the one or more network nodes further implement the NSSF, and wherein the NSSF responds to the request from the NEF by updating slice information for the communication device, to indicate the quarantine network slice, and sending signaling to an Access and Mobility management Function (AMF) of the communication network, the signaling indicating to the AMF to initiate the re-registration of the communication device, wherein the NSSF indicates to the AMF that the quarantine network slice should be selected for the communication device.

3. The method of claim 1, wherein detecting the device anomaly comprises detecting, as the anomalous state, an incorrect software identifier or software fingerprint for a software application running in the communication device in support of the one or more application services used by the communication device, based on comparing a detected software identifier or a detected software fingerprint for the communication device with a stored software identifier or a stored software fingerprint held in the communication network for the communication device.

4. The method of claim 1, wherein detecting the device anomaly comprises detecting, as the anomalous behavior, anomalous communication activity by the communication device in the communication network, based on detecting a deviation by the communication device from historic or characteristic communication activity, as known from corresponding information stored in the communication network for the communication device.

5. The method of claim 4, wherein the anomalous communication activity comprises user-plane and/or control-plane activity, and wherein detecting the deviation comprises evaluating historic communication-activity data collected in the communication network for the communication device and discerning one or more user-plane or control-plane events involving the communication device that are anomalous relative to a normative pattern established by the historic communication-data activity.

6. The method of claim 1, wherein the method further comprises providing communication-activity data for the communication device to the AS, the communication-activity data indicating control-plane events in the communication network involving the communication device, and thereby enabling the AS to detect the communication device as being compromised, based on the AS detecting anomalous control-plane activity involving the communication device.

7. The method of claim 1, wherein the NEF comprises a first NEF, and wherein the method further comprises the first NEF, or a second NEF that is associated with the quarantine network slice:
   receiving an indication from the AS that the compromise of the communication device is ended; and
   responsive to receiving the indication, initiating recovery operations to return the communication device to the first network slice, for management of the communication device as an uncompromised device, the recovery operations including sending a further request to the NSSF, to initiate re-registration of the communication device with the communication network, for re-connection of the communication device to the communication network via the first network slice;
   wherein the one or more network nodes implement the second NEF.

8. The method of claim 7, wherein the communication device is one among two or more communication devices that are moved to the quarantine network slice as compromised devices, and wherein the method further comprises prioritizing the performance of the recovery operations for at least one of the two or more communication devices, based on comparing a communication criticality metric or a financial metric associated with the one or more application services used by each of the two or more communication devices.

9. The method of claim 7, further comprising sending a return indication to the AS, responsive to detecting the communication device re-connecting to the communication network via the first network slice.

10. The method of claim 7, wherein sending the further request to the NSSF includes indicating that the further request is a recovery operation, for use by the NSSF in prioritizing the further request.

11. The method of claim 1, wherein the quarantine network slice is user-group specific, and wherein the method further comprises determining a group affiliation of the communication device and selecting the quarantine network slice from among a set of two or more available network slices defined for quarantine use, based on the group affiliation of the communication device.

12. The method of claim 1, wherein the quarantine network slice is specific to a network area of the communication network, and wherein the method further comprises determining a network location of the communication device, based on which access node or access nodes of the communication network the communication device is communicatively coupled to, and selecting the quarantine network slice from among a set of two or more available network slices defined for quarantine use, based on the network area including the network location.

13. The method of claim 1, wherein the communication network comprises a wireless communication network communicatively coupling an Internet-of-Things (IoT) device, as said communication device, to an IoT AS, as said AS.

14. A network node configured for operation in a communication network, the network node comprising:
   interface circuitry configured to communicatively couple the network node with an Application Server (AS) that supports one or more application services used by a communication device that communicatively couples with the AS via a first network slice provided by the communication network; and
   processing circuitry that is operatively associated with the interface circuitry and configured to implement a Network Exposure Function (NEF) in the communication network, the NEF configured to:
   determine that the communication device is compromised, based on detecting a device anomaly regarding the communication device, the device anomaly being an anomalous state or behavior of the communication device, or based on receiving signaling incoming from the AS, indicating that the communication device is compromised; and
   responsive to determining that the communication device is compromised, initiate quarantine operations to move the communication device from the first network slice to a second network slice, for management of the communication device as a compromised device, the second network slice referred to as a quarantine network slice and the quarantine operations including sending a request to a Network Slice Selection Function (NSSF), to initiate re-registration of the communication device with the communication network, for re-connection of the communication device to the communication network via the quarantine network slice.

15. The network node of claim 14, wherein the processing circuitry is further configured to implement the NSSF, and wherein the NSSF is configured to respond to the request from the NEF by updating slice information for the communication device, to indicate the quarantine network slice, and sending signaling to an Access and Mobility management Function (AMF) of the communication network, the signaling indicating to the AMF to initiate the re-registration of the communication device, wherein the NSSF indicates to the AMF that the quarantine network slice should be selected for the communication device.

16. The network node of claim 14, wherein the communication network comprises a wireless communication network communicatively coupling an Internet-of-Things (IoT) device, as said communication device, to an IoT AS, as said AS.

17. A network node configured for operation in a communication network, the network node comprising a set of processing modules operative as a Network Exposure Function (NEF) in the communication network, the set comprising:
   a communicating module configured to communicatively couple the NEF with an Application Server (AS) that supports one or more application services used by a communication device that communicatively couples with the AS via a first network slice provided by the communication network;
   a determining module configured to determine that the communication device is compromised, based on detecting a device anomaly regarding the communication device, the device anomaly being an anomalous state or behavior of the communication device, or based on receiving signaling incoming from the AS, indicating that the communication device is compromised; and
   a quarantining module that is configured to initiate quarantine operations to move the communication device from the first network slice to a second network slice, for management of the communication device as a compromised device, the second network slice referred to as a quarantine network slice and where the quarantine operations are initiated by the quarantining module responsive to the determination that the communication device is compromised, and include sending a request to a Network Slice Selection Function (NSSF), to initiate re-registration of the communication device with the communication network, for re-connection of the communication device to the communication network via the quarantine network slice.

* * * * *